United States Patent [19]

Vanderslice

[11] 4,163,577
[45] Aug. 7, 1979

[54] CAMPER MODULE

[76] Inventor: Ira C. Vanderslice, 100 Callie Ct., Loveland, Colo. 80537

[21] Appl. No.: 905,191

[22] Filed: May 12, 1978

[51] Int. Cl.² .............................................. B60P 3/34
[52] U.S. Cl. .................................... 296/164; 296/175
[58] Field of Search ................ 296/23 R, 23 F, 23 G, 296/23 MC, 26, 27; 52/64

[56] References Cited

U.S. PATENT DOCUMENTS 3,778,100  12/1973  Dillard ................................... 296/26
3,888,539  6/1975   Niessner ......................... 296/23 MC Primary Examiner—Philip Goodman
Attorney, Agent, or Firm—H. Kenneth Johnston, II

[57] ABSTRACT

A removable and foldable camper module as provided which converts a utility vehicle, such as a van, into a recreational vehicle. The camper module includes kitchen cabinets and storage area with bench type seats attached to the opposite side of the kitchen area. When the module is collapsed, it can be easily removed from the van by two people. In the expanded mode, the module provides the necessary fixtures that one would have in a recreational vehicle, but still allows mobility by the person using it. For storage and handling, the camper module folds in the center forming a compact rectangular package.

10 Claims, 2 Drawing Figures

U.S. Patent    Aug. 7, 1979    4,163,577

CAMPER MODULE

BACKGROUND OF THE INVENTION

1. Field of the Invention

This invention relates generally to a portable camper module for installation in a utility vehicle such as a van. More particularly, to a camper module which is easily installed or removed by collapsing or expanding the camper module.

2. Description of the Prior Art

Vans, in recent years, have been converted to campers by the installation of permanent fixtures, building such into the bed and walls of the van such as items of furniture, cabinet storage areas, and the like. In the usual instance, such items of furniture are usually installed as a separate piece, and, in others, are permanently installed. Vans which have been converted in this manner to the recreational vehicle when traded have all the conversion left in the van and a new purchase requires the installation of new or different equipment to convert the van to a recreational vehicle.

SUMMARY OF THE INVENTION

In accordance with the broader aspects of this invention there is provided a portable camper module which may be collapsed or expanded for easy installation and removal from a van-type utility vehicle. The module folds in the floor and ceiling and the folds are directly opposed to each other; however, such opposition is not required except that the floor and ceiling each fold equally together. In another embodiment of this invention, a support means such as a glide, runner, or wheel is affixed to the floor of the module wherein the support means is placed in the upright position when the module is collapsed and permits the module to move in the van for easy removal. Upon expanding the module, the support means collapses into the floor, permitting stability of the module in the utility vehicle. It is an object of this invention to provide a portable camper module which is easily convertible into its storage configuration or the recreational mode and further provides a means of making this conversion with different vans without the requirement of purchasing a new module or interior fixtures as required by permanent installations. The above mentioned and other features and objects of this invention and the manner of attaining them will become more apparent, and the invention itself will be best understood by reference to the following description of the embodiment of the invention, taken in conjunction with the accompanying drawings.

DESCRIPTION OF THE PREFERRED EMBODIMENT

Figure 1:
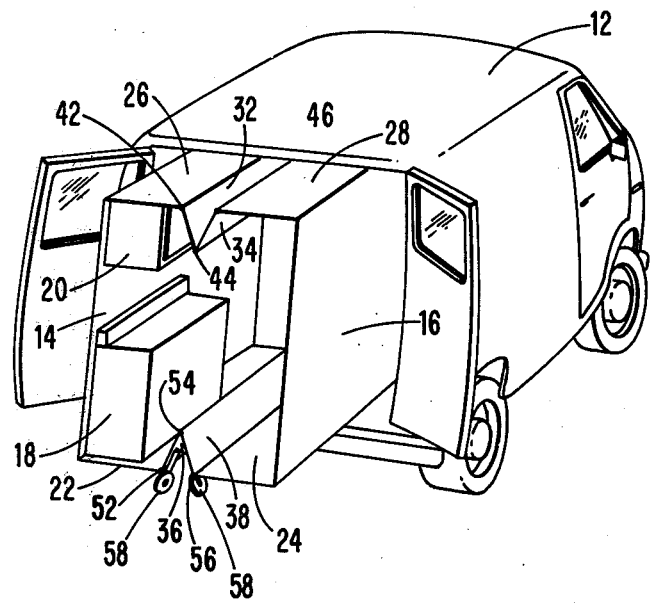
FIG. 1 is a rear view of a van with a module of this invention partially positioned therein for installation in the van.
Figure 2:
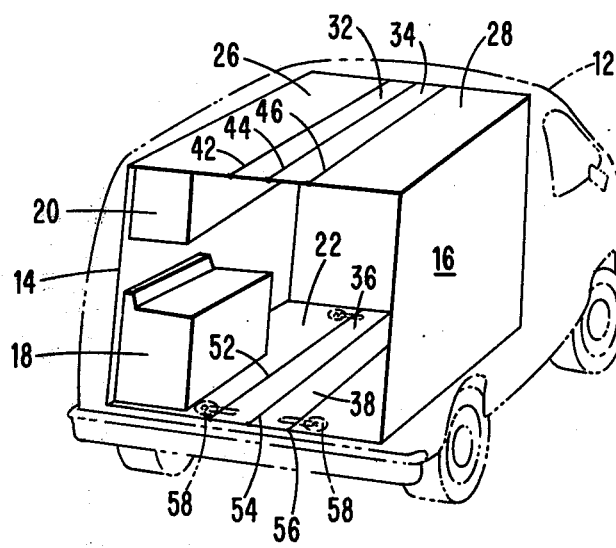
FIG. 2 illustrates the camping module in its extended position with the support means being retraced in the module.

Referring to the drawings, the camper module of this invention is shown in its collapsed configuration for storage and assembly in the interior as an erected and extended camper unit as shown in FIG. 2. Referring to FIG. 1, the camper module includes two (2) vertical walls indicated by reference numerals 14 and 16 whereby said walls have numerous fixtures means attached to said walls such as cabinets 18 and cupboards 20. For the purpose of holding cabinets and fixtures stationary, vertical walls 14 and 16 are affixed to first and second lower stationary horizontal members 22 and 24 and first and second upper stationary members 26 and 28 whereby first and secod lower folding members 36 and 38 and first and second upper folding horizontal members 32 and 34 are capable of expanding or collapsing by the cooperation of the upper hinges 42, 44, and 46 of lower hinges 52, 54, and 56. FIG. 2 shows the camper module in the expanded mode whereby support means 58 are in the retraced position and the camper module is in the locked position of the van where the upper hinges 42, 44, 46 and lower hinges 52, 54, and 56 have cooperated together in expanding the camper module utilizing the maximum space of the van.

In describing above the principals of the invention in connection with the specific apparatus, it is to be clearly understood that the description is made only by way of example, and not as a limitation to the scope of the invention. Various modifications may be constructed or performed within the scope of the inventive concept as disclosed, such as the collapsable modules may have various shelves for storage of spare or repair parts and may be used for different types of repair business by merely installing a different module having different equipment and parts as TV repair or refrigeration repair modules. Therefore, what has been set forth is intended to describe and/or illustrate such concepts. It is not for the purpose of limiting protection to any herein particulary described embodiment thereof. It is understood that one skilled in the art to which this invention relates may make changes in construction and widely different embodiments, and applications of the invention will suggest themselves without departing from the spirit and scope of the invention, and that such changes and modifications would be known to one skilled in the art.

What is claimed:

1. A camper module, for use in combination with a rear opening van-type vehicle to form a temporary room-like interior thereof which comprises:

a frame;

said frame including a first vertical side and a second vertical side opposite to each other capable of supporting a fixture means for relaxation and storage;

an upper horizontal member containing a plurality of sections; said sections connected by a plurality of hinge means capable of folding said plurality of sections together;

said upper horizontal member having a first end and a second end, said first end is affixed to said first vertical side, and said second end is affixed to said second vertical side forming a ceiling in an extended position;

a lower horizontal member having a first end and a second end;

said first end is affixed to said first vertical side at the opposite end in which said upper horizontal member is affixed and said second end is affixed to said second vertical side at the opposite end in which said upper horizontal member is affixed containing a plurality of sections forming a floor in said extended position;

said plurality of sections is connected by a plurality of hinge means capable of folding said plurality of sections together;

a plurality of foldable support means affixed to said lower horizontal members so that when said lower member is folded, said foldable support means is extended from a collapsed position to an erect position, permitting movement of said camper module;

said upper horizontal member and said lower horizontal member simultaneously cooperate together to permit collapsing and extending of the camper module for easy removal and storage or insertion and erection of said camper module.

2. A camper module, as set forth in claim 1 wherein said hinged means are piano hinges.

3. A camper module, as set forth in claim 1 wherein said fixture means are cabinets.

4. A camper module as set forth in claim 1 wherein said fixture means are sleeping means.

5. A camper module as set forth in claim 1 wherein said fixture means are a combination of cabinets and sleeping means.

6. A camper module as set forth in claim 1 wherein said sections are the same size.

7. A camper module, as set forth in claim 1 wherein said sections have more than one sized section.

8. A camper module as set forth in claim 1 wherein said fixture means is a refrigerator or ice box.

9. A camper module as set forth in claim 1 wherein said fixture means is a cooking and washing means.

10. A camper module as set forth in claim 1 wherein said support means is a glide, runner, or a wheel.

* * * * *